United States Patent
Yoshida et al.

(10) Patent No.: US 11,959,783 B2
(45) Date of Patent: Apr. 16, 2024

(54) FIELD DEVICE

(71) Applicant: YOKOGAWA ELECTRIC CORPORATION, Musashino (JP)

(72) Inventors: Fumihiro Yoshida, Musashino (JP); Shunsuke Ebisumoto, Musashino (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 0 days.

(21) Appl. No.: 17/691,837

(22) Filed: Mar. 10, 2022

(65) Prior Publication Data

US 2022/0316925 A1 Oct. 6, 2022

(30) Foreign Application Priority Data

Mar. 30, 2021 (JP) ................. 2021-058313

(51) Int. Cl.
*G01F 1/32* (2022.01)

(52) U.S. Cl.
CPC .. *G01F 1/3209* (2013.01); *G05B 2219/25428* (2013.01)

(58) Field of Classification Search
CPC ................. G01F 25/10; G01F 25/24
See application file for complete search history.

(56) References Cited

U.S. PATENT DOCUMENTS

| | | | | |
|---|---|---|---|---|
| 7,073,393 B2 * | 7/2006 | Webb | ............ | G01F 1/60 73/861.12 |
| 2015/0323357 A1 | 11/2015 | Foster et al. | | |
| 2017/0160727 A1 * | 6/2017 | Ishikawa | ............ | G05B 19/4184 |

FOREIGN PATENT DOCUMENTS

| JP | H06-33638 A | 2/1994 |
|---|---|---|
| JP | H0674987 A | 3/1994 |
| JP | H1114663 A | 1/1999 |
| JP | 2000205908 A | 7/2000 |
| JP | 2002-175112 A | 6/2002 |
| JP | 2002188411 A | 7/2002 |
| JP | 2006114056 A | 4/2006 |

(Continued)

OTHER PUBLICATIONS

Office Action dated Jan. 23, 2024, issued in counterpart JP application No. 2021-058313, with English translation. (13 pages).

*Primary Examiner* — Erika J. Villaluna
(74) *Attorney, Agent, or Firm* — WHDA, LLP (57) ABSTRACT

A field device (10) includes a sensor (11) that measures a physical quantity and outputs a measurement signal indicating a measured value, converters (12, 15, 16) that perform a predetermined conversion process on the measurement signal, and a processor (17) that outputs an output signal corresponding to the measurement signal subjected to the conversion process. The processor (17) starts verifying operational soundness of the converters (12, 15, 16) when the measurement signal subjected to the conversion process satisfies a predetermined condition, and outputs, while the operational soundness of the converters (12, 15, 16) is being verified, a signal corresponding to the measurement signal subjected to the conversion process and acquired immediately before the operational soundness of the converters (12, 15, 16) is verified, or a signal corresponding to the measurement signal indicating a predetermined measured value of the sensor (11), as the output signal.

9 Claims, 6 Drawing Sheets

(56) References Cited

FOREIGN PATENT DOCUMENTS

| | | | |
|---|---|---|---|
| JP | 2008004113 | A | 1/2008 |
| JP | 2013003836 | A | 1/2013 |
| JP | 2013-236254 | A | 11/2013 |
| JP | 2017-102780 | A | 6/2017 |
| JP | 2017515132 | A | 6/2017 |
| JP | 2019021048 | A | 2/2019 |

* cited by examiner

FIELD DEVICE

CROSS-REFERENCE TO RELATED APPLICATION

The present application claims priority to Japanese Patent Application No. 2021-058313 filed on Mar. 30, 2021, the entire contents of which are incorporated herein by reference.

TECHNICAL FIELD

The present disclosure relates to a field device.

BACKGROUND

A field device is an apparatus that measures physical quantities in a plant using sensors and transmits the measured physical quantities to other apparatuses. Field devices are often used while attached to piping or the like in a plant, making it desirable to verify the operational soundness of the device while the device is attached to the piping or the like. Patent literature (PTL) 1 discloses a field device with a configuration for verifying the operational soundness of the device itself. According to the configuration in PTL 1, the operational soundness of the device can be verified while the device is attached to piping.

CITATION LIST

Patent Literature

PTL 1: JP 2017-102780 A

SUMMARY

A field device according to an embodiment includes a sensor configured to measure a physical quantity and output a measurement signal indicating a measured value; a converter configured to perform a predetermined conversion process on the measurement signal; and a processor configured to output an output signal corresponding to the measurement signal subjected to the conversion process, wherein the processor starts verifying operational soundness of the converter in a case in which the measurement signal subjected to the conversion process satisfies a predetermined condition, and outputs, while the operational soundness of the converter is being verified, a signal corresponding to the measurement signal subjected to the conversion process and acquired immediately before the operational soundness of the converter is verified, or a signal corresponding to the measurement signal indicating a predetermined measured value of the sensor, as the output signal.

DETAILED DESCRIPTION

The configuration in PTL 1 switches the signal of a measured value outputted by the sensor to a simulated signal and then inputs the simulated signal to a processing system for processing the measured value so as to verify the operational soundness of the processing system. The configuration in PTL 1 therefore cannot output the measured value of a physical quantity while the soundness is being verified.

It would be helpful to provide a field device capable of outputting the measured value of a physical quantity even while the operational soundness of the field device is being verified.

A field device according to an embodiment includes a sensor configured to measure a physical quantity and output a measurement signal indicating a measured value; a converter configured to perform a predetermined conversion process on the measurement signal; and a processor configured to output an output signal corresponding to the measurement signal subjected to the conversion process, wherein the processor starts verifying operational soundness of the converter in a case in which the measurement signal subjected to the conversion process satisfies a predetermined condition, and outputs, while the operational soundness of the converter is being verified, a signal corresponding to the measurement signal subjected to the conversion process and acquired immediately before the operational soundness of the converter is verified, or a signal corresponding to the measurement signal indicating a predetermined measured value of the sensor, as the output signal. In this way, the processor starts verifying the operational soundness of the converter in a case in which the measurement signal subjected to the conversion process satisfies a predetermined condition. While the operational soundness of the converter is being verified, the processor outputs a signal corresponding to the measurement signal subjected to the conversion process and acquired immediately before the operational soundness of the converter is verified, or to the measurement signal indicating a predetermined measured value of the sensor, as the output signal. The field device can therefore output the measured value of a physical quantity even while the operational soundness of the field device is being verified.

In the field device according to an embodiment, the processor starts verifying the operational soundness of the converter in a case in which, as the predetermined condition, a signal level of the measurement signal subjected to the conversion process continues to be below a predetermined threshold for a predetermined reference time. Therefore, the verification of the operational soundness of the field device can start automatically in response to the physical quantity measured by the sensor being considered to be 0 continuously for a reference time.

In the field device according to an embodiment, the processor outputs, while the operational soundness of the converter is being verified, a signal corresponding to the measurement signal indicating that the measured value is 0 as the output signal. When the state in which the physical quantity measured by the sensor is 0 continues for a certain period of time, the physical quantity typically does not change right away during the relatively short period of time for verifying the soundness. The field device can therefore output a value reflecting the physical quantity even while the operational soundness of the field device is being verified.

In the field device according to an embodiment, the processor verifies the operational soundness of the converter based on a waveform of a signal outputted by the converter while an output of a simulated signal generation circuit that outputs a simulated signal with a predetermined waveform is being inputted to the converter. Therefore, the operational soundness of the field device can be verified by a simple process. The simulated signal from the simulated signal generation circuit may be a signal whose frequency fluctuates in a specific pattern, instead of a signal with a constant frequency. If a circuit of the field device oscillates by chance at the same frequency as that of the simulated signal due to failure, this configuration prevents a situation in which the oscillating signal caused by such a failure cannot be distinguished from a signal based on the simulated signal. The reliability of verification thus improves.

In the field device according to an embodiment, the processor verifies the operational soundness of the converter based on a frequency of the signal outputted by the converter while an output of the simulated signal generation circuit that outputs a signal of a predetermined frequency as the simulated signal is being inputted to the converter. Therefore, the operational soundness of the field device can be verified by a simple process.

In the field device according to an embodiment, the processor switches an input to the converter from the output of the sensor to the output of the simulated signal generation circuit and verifies the operational soundness of the converter based on the signal outputted by the converter. Therefore, the operational soundness of the converter can be verified by simply switching the input to the converter. The operational soundness of the field device can thus be verified by a simple process.

In the field device according to an embodiment, in a case in which an abnormality is detected by verification of the operational soundness of the converter, the processor outputs a signal indicating detection of the abnormality as the output signal. Therefore, a user can easily learn of the failure by being notified according to the output of such an abnormality detection signal.

In the field device according to an embodiment, the conversion process includes a process to amplify the measurement signal, a process to limit a frequency band of the measurement signal, and/or a process of analog-to-digital conversion on the measurement signal. Therefore, according to the field device, the operation of the portion that executes a process to amplify the measurement signal, a process to limit a frequency band of the measurement signal, and/or a process of analog-to-digital conversion on the measurement signal can be verified.

In the field device according to an embodiment, the sensor may measure a vortex generated in a fluid as the physical quantity. Therefore, the field device can be applied to a vortex flowmeter.

The field device according to an embodiment may further include a first sensor and a second sensor; a first converter configured to perform a first conversion process on a first measurement signal outputted by the first sensor; and a second converter configured to perform a second conversion process on a second measurement signal outputted by the second sensor, wherein the processor starts verifying the operational soundness of the first converter and the second converter in a case in which a ratio between a signal level of the first measurement signal subjected to the first conversion process by the first converter and a signal level of the second measurement signal subjected to the second conversion process by the second converter satisfies the predetermined condition. Therefore, the operational soundness of the field device can be automatically verified at the timing at which the occurrence of a failure is suspected due to the level ratio of the measurement signal deviating from the values that can be taken during normal operation.

According to the present disclosure, the measured value of a physical quantity can be outputted even while the operational soundness of a field device is being verified.

Comparative Example

Figure 1:
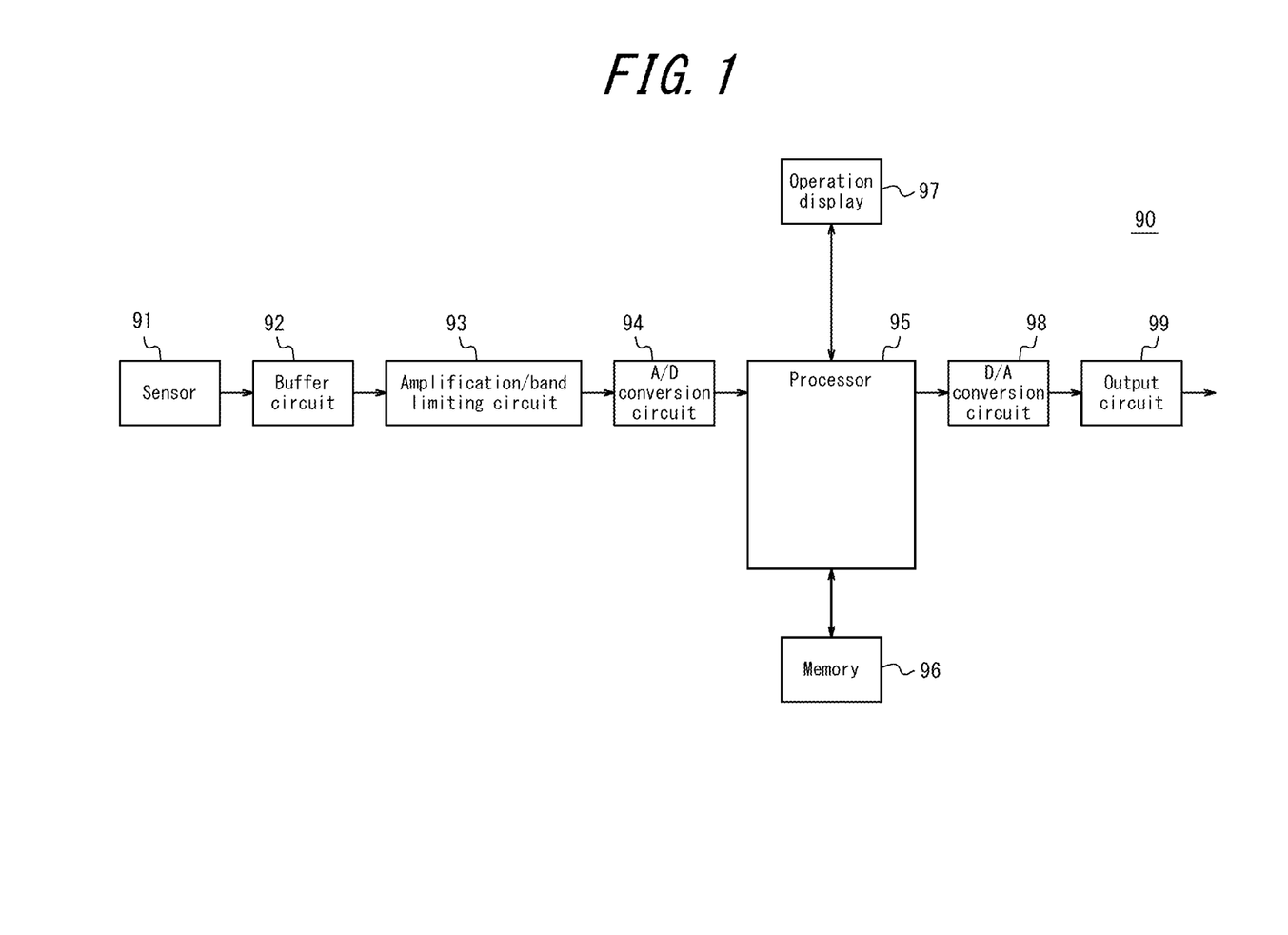
FIG. 1 is diagram illustrating the configuration of a field device according to a comparative example.

FIG. 1 is diagram illustrating the configuration of a field device 90 according to a comparative example. The field device 90 includes a sensor 91, a buffer circuit 92, an amplification/band limiting circuit 93, an analog-to-digital (A/D) conversion circuit 94, a processor 95, a memory 96, an operation display 97, a digital-to-analog (D/A) conversion circuit 98, and an output circuit 99.

The sensor 91 measures a physical quantity such as flow rate, temperature, or pressure and acquires a measured value. The measured value of the physical quantity acquired by the sensor 91 is an analog signal and is temporarily stored in the buffer circuit 92. A process is performed in the amplification/band limiting circuit 93 to amplify and limit the frequency band of the measured values stored in the buffer circuit 92. The output of the process in the amplification/band limiting circuit 93 is converted to a digital signal by A/D conversion in the A/D conversion circuit 94 and is outputted to the processor 95. The processor 95 stores data related to the measured values in the memory 96 and performs appropriate signal processing on the measured values in response to an operation selected by a user (plant operator or the like) on the operation display 97. The signals processed by the processor 95 are converted to analog signals by D/A conversion in the D/A conversion circuit 98 and are outputted to an external destination through the output circuit 99.

Since the field device 90 according to the comparative example does not include a configuration for verifying its own operational soundness, the field device 90 needs to be removed from the piping or the like of the plant to verify the operational soundness. The field device 90 therefore cannot output the measured value of a physical quantity while the operational soundness is being verified.

EMBODIMENTS OF PRESENT DISCLOSURE

Embodiments of the present disclosure are described below with reference to the drawings. Identical or equivalent portions in the drawings are labeled with the same reference signs. In the explanation of the embodiments, a description of identical or equivalent portions is omitted or simplified as appropriate.

First Embodiment

Figure 2:
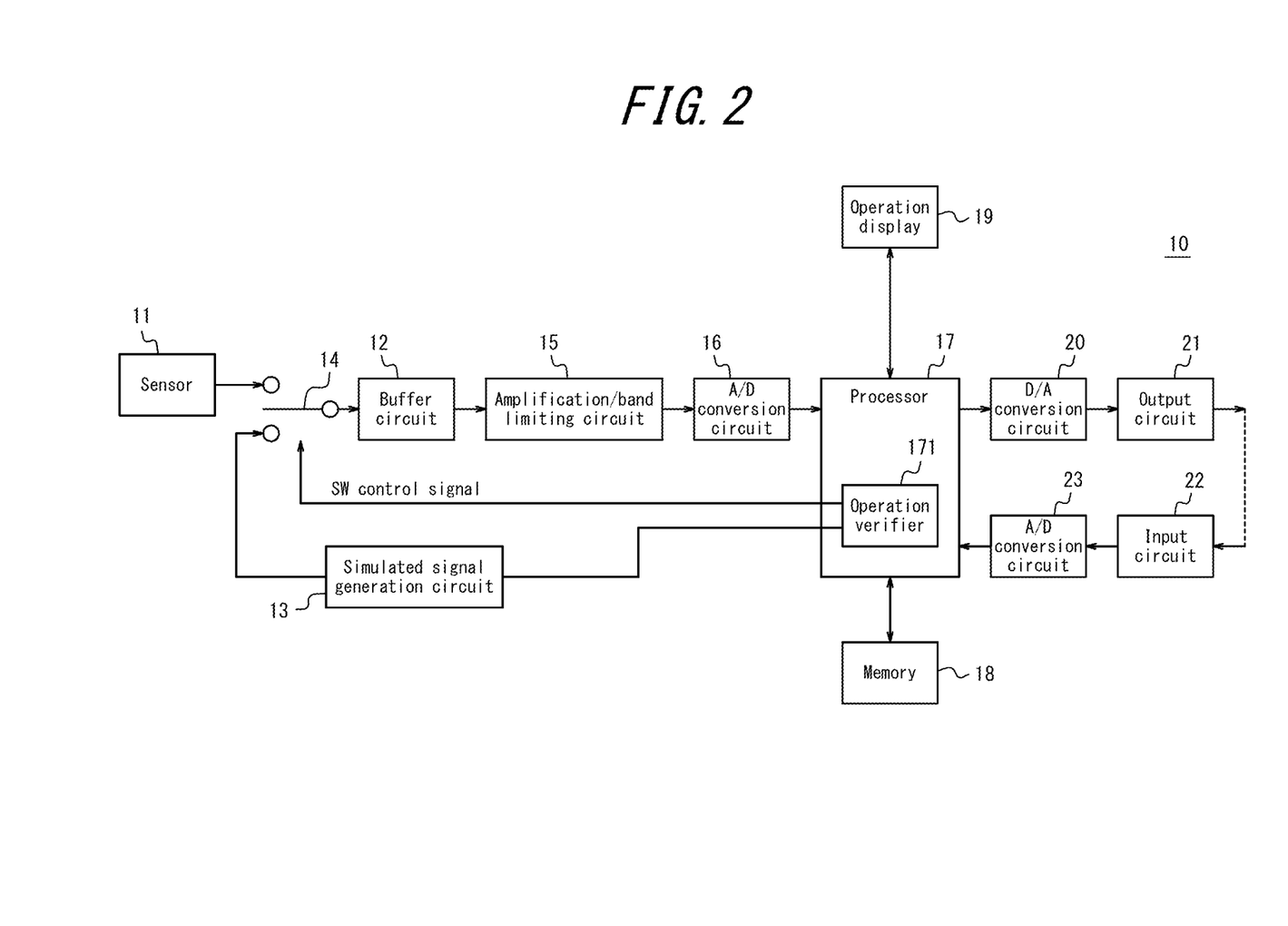
FIG. 2 is a diagram illustrating an example configuration of a field device according to a first embodiment.

FIG. 2 is a diagram illustrating an example configuration of a field device 10 according to a first embodiment. The field device 10 includes a sensor 11, a buffer circuit 12, a simulated signal generation circuit 13, a switch 14, an amplification/band limiting circuit 15, an A/D conversion circuit 16, a processor 17, a memory 18, an operation display 19, a D/A conversion circuit 20, an output circuit 21, an input circuit 22, and an A/D conversion circuit 23.

The field device 10 is a field device installed in equipment located in various plants such as industrial plants, resource plants, power generation plants, or plants related to water and sewage. In the present embodiment, an example is described in which the field device 10 is a vortex flowmeter that measures vortex flow rate by measuring the vortex generated in a fluid. The type of field device 10 is not, however, limited to a vortex flowmeter. For example, the field device 10 may be any of various flowmeters such as an electromagnetic flowmeter, a Coriolis flowmeter, and an ultrasonic flowmeter; a differential pressure/pressure transmitter; a temperature transmitter; a level meter; an actuator with a control function to control the operation of various equipment; a vibrometer; a noise meter; a thermometer; a corrosion detector; a field indicator; an electro-pneumatic transducer; an optical fiber temperature sensor; a small pressure sensor; and the like.

The sensor 11 is a measurement unit that measures a physical quantity in the equipment where the field device 10 is installed. Since the field device 10 in the present embodiment is a vortex flowmeter, the sensor 11 includes a vortex generator that generates a Karman vortex and a pressure sensor such as a piezoelectric element that measures the pressure applied to the vortex generator by the Karman vortex. The sensor 11 measures the frequency (period) of the pressure that changes due to the Karman vortex and outputs a sinusoidal signal of the measured frequency to the buffer circuit 12 as a measurement signal representing the fluid velocity. The measurement signal is typically a sine wave.

The buffer circuit 12 is a buffer circuit for passing the measurement signal outputted from the sensor 11 to the amplification/band limiting circuit 15. The buffer circuit 12 is a conversion circuit that converts the impedance of the measurement signal outputted from the sensor 11 and outputs the measurement signal subjected to impedance conversion to the amplification/band limiting circuit 15.

The amplification/band limiting circuit 15 is a conversion circuit that converts the signal level of the measurement signal, which was subjected to impedance conversion and outputted from the buffer circuit 12, limits the range of the frequency band, and outputs the result to the A/D conversion circuit 16. The amplification/band limiting circuit 15 includes an amplifying function to amplify the measurement signal outputted from the buffer circuit 12 and a band limiting function to limit the frequency band of the measurement signal. More specifically, the amplification/band limiting circuit 15 converts (amplifies) the signal level (for example, the signal amplitude) of the measurement signal outputted from the buffer circuit 12 to a level that allows sufficient resolution of the digital value of the analog-to-digital conversion in the A/D conversion circuit 16. The amplification/band limiting circuit 15 also uses a low-pass filter (LPF), a high-pass filter (HPF), a band-pass filter (BPF), or the like to limit the frequency band of the measurement signal outputted from the buffer circuit 12. As a result, unnecessary noise components included in the measurement signal are removed. The measurement signal after the noise components are removed is outputted to the A/D conversion circuit 16. In the following description, the measurement signal outputted by the amplification/band limiting circuit 15 is referred to as an "analog measurement signal".

The A/D conversion circuit 16 is a conversion circuit that performs analog-to-digital conversion on the analog measurement signal (analog signal) outputted by the amplification/band limiting circuit 15 to generate a digital signal (digital measurement signal) with a digital value corresponding to the magnitude of the signal level of the measurement signal measured by the sensor 11. The generated digital measurement signal is outputted to the processor 17.

The processor 17 is a controller that controls each component of the field device 10. The processor 17 recognizes the presence of fluid when the signal level (for example, the signal amplitude) of the measurement signal from the sensor 11 exceeds a certain threshold and counts the corresponding frequency. A band-pass filter that is most suitable for such a signal frequency is selected in the amplification/band limiting circuit 15. The processor 17 then performs a Fourier transform on the inputted digital measurement signal and calculates each frequency spectrum (spectral signal processing function). This frequency is proportional to the flow rate. The processor 17 outputs a digital signal proportional to the frequency as a signal indicating the flow rate to the D/A conversion circuit 20. The processor 17 itself may include a digital filter that extracts a specific frequency component from the digital measurement signal. The processor 17 may also select and use an appropriate band-pass filter for measuring the flow rate according to the inputted digital measurement signal. This enables the processor 17 to measure the flow rate of the fluid accurately.

The processor 17 is, for example, configured by a central processing unit (CPU). The processor 17 controls operations of each component of the field device 10 according to application programs and data for realizing the functions of the field device 10. The processor 17 also performs predetermined arithmetic processing for presenting the operating status of the equipment, in which the field device 10 is installed, according to the executed application program. For example, the processor 17 may perform arithmetic processing to convert the digital measurement signal outputted by the A/D conversion circuit 16 into a digital signal indicating a value in the range of 4 mA to 20 mA to represent the operating status of the equipment. The digital signal after the arithmetic processing is outputted to the D/A conversion circuit 20. The processor 17 may also perform arithmetic processing to generate display data for displaying, on the operation display 19, the results of the arithmetic processing, i.e., the operating status of the equipment in which the field device 10 is installed. The display data after the arithmetic processing is outputted to the operation display 19. In this way, the processor 17 controls the display of the display data by the operation display 19. The processor 17 may also perform control so that the digital signal after the arithmetic processing is transmitted, over a dedicated communication network established in the plant, to a controller that controls operation of the equipment in the plant, for example.

The processor 17 also includes an operation verifier 171 that controls the process for verifying the operational soundness of the components of the field device 10. The processor 17 activates the operation verifier 171 in response to a verification execution instruction signal inputted from the operation display 19 and verifies the operational soundness of the components of the field device 10. In the present embodiment, the input to the buffer circuit 12 is switched, by the switch 14, between the output of the sensor 11 and the output of the simulated signal generation circuit 13. The operation verifier 171 controls the connection of the switch 14 by outputting a switch (SW) control signal to the switch 14 so as to switch the input of the buffer circuit 12 between the output of the sensor 11 and the output of the simulated signal generation circuit 13. In the present embodiment, the operational soundness of the buffer circuit 12, the amplification/band limiting circuit 15, and the A/D conversion circuit 16 is verified. Here, operational soundness refers to the verification target being capable of performing the desired operation normally.

The operation verifier 171 may execute an operation verification program when verifying the operation of the components of the field device 10 and control operations of the components of the field device 10 according to the executed operation verification program. The operation verification program is an application program for verifying the operation of the components of the field device 10. The operation verification program is stored in a storage provided in the processor 17 or is stored in the memory 18. For each verification item, the operation verifier 171 outputs the result (verification result) of the verification of operational soundness conducted for each component in accordance with the executed operation verification program. The operation verifier 171 also outputs the results of the final determination of the verification results for all the verification items, i.e., the final verification results of the soundness of the field device 10. The processor 17 stores the verification result of each verification item for the components and the final verification result of soundness (hereinafter referred to simply as "verification results" when the respective verification results are expressed without distinction), outputted by the operation verifier 171, in the memory 18. The verification items for the components of the field device 10 may, for example, include the operational soundness of the sensor 11 and the operational soundness of the buffer circuit 12, the amplification/band limiting circuit 15, and the A/D conversion circuit 16.

The processor 17 may output the final verification result of soundness, outputted by the operation verifier 171, as display data to the operation display 19 and control the display of the display data by the operation display 19. The processor 17 may display the state (for example, statuses such as the progress, elapsed time, scheduled end time, and end notification) as display data on the operation display 19 when the operation verifier 171 is verifying the operation of each component. The processor 17 may sequentially display the verification result of each verification item for each component outputted by the operation verifier 171 as display data on the operation display 19. In this case, the processor 17 may switch the verification items of the verification results displayed on the operation display 19 according to a verification result switching instruction that is inputted from the operation display 19 operated by the user. A detailed description of the control of the operation of the components according to the operation verification program and the method of verifying the soundness of the field device 10 will be provided later.

The memory 18 is a storage that stores the application programs executed by the processor 17 and data during execution. The memory 18 is configured by various types of memory, such as read only memory (ROM), random access memory (RAM), or flash memory. The memory 18 stores (writes) data and outputs (reads) data in response to control by the processor 17.

The memory 18 may also store the results of verification, performed by the operation verifier 171 in accordance with the operation verification program, for each component of the field device 10 and for the soundness of the field device 10 as a whole. The memory 18 may store the operation verification program executed by the operation verifier 171.

The operation display 19 is a human machine interface (HMI) that includes a display for displaying the display data outputted by the processor 17 and an operation interface operated by the user. The display is a display device such as a liquid crystal display (LCD). By displaying the display data and the like outputted by the processor 17, the display presents the user with information such as the operating status of the installed equipment, the final verification result for the soundness of the field device 10, the verification result for each component for which the operation verification was performed, and the current state (status) when the operation verification is being performed. The operation interface is, for example, an operation device that includes buttons, a keyboard, or the like. The operation interface receives operations by the user and outputs information representing the received user operations to the processor 17, that is, instruction signals representing instructions from the user for operation of the field device 10. When the user performs an operation to instruct that verification of the soundness of the field device 10 be executed, the operation interface outputs the verification execution instruction signal corresponding to this operation to the processor 17.

The operation interface is not limited to buttons or keyboards and may, for example, be configured by a pressure sensor provided in the display. In other words, the operation display 19 may be configured as a touch panel that combines the display and the operation interface. In this case, the operation display 19 displays various information on the display to present the information to the user, and the operation interface detects various touch operations (tap, flick, and the like) performed by the user, based on the information displayed on the display, to receive instructions for operation of the field device 10. The operation display 19 outputs information representing the received user operations to the processor 17.

The D/A conversion circuit 20 performs digital-to-analog conversion on the digital signal, outputted by the processor 17, after the arithmetic processing to generate an analog signal (for example, a direct current (DC) analog signal in the range of 4 mA to 20 mA) representing the magnitude of the signal level of the measurement signal measured by the sensor 11. The D/A conversion circuit 20 outputs the generated analog signal to the output circuit 21. When performing digital-to-analog conversion, the D/A conversion circuit 20 may, for example, perform pulse width modulation (PWM) or the like and output a PWM signal or the like.

The output circuit 21 outputs the analog signal outputted from the D/A conversion circuit 20 as an output signal to a destination external to the field device 10, such as a control apparatus that controls operation of the equipment in the plant. The output circuit 21 outputs a DC analog signal in the range of 4 mA to 20 mA, for example, as an output signal indicating the signal level of the measurement signal measured by the sensor 11. In the field device 10, the output signal outputted by the output circuit 21 may be inputted to the input circuit 22 via a non-illustrated switch in response to control from the operation verifier 171 provided in the processor 17.

In a case in which the field device 10 communicates over a dedicated communication network established in the plant, the output circuit 21 may superimpose the communication signal outputted by the processor 17 or by a non-illustrated communication interface on the output signal and output the result. The communication signal outputted from the processor 17 or the non-illustrated communication interface may include information to be displayed on the display included in the operation display 19, that is, information such as the operating status of the installed equipment, the final verification result for the soundness of the field device 10, the verification result for each component for which the operation verification was performed, and the current state (status) when the operation verification is being performed. The output circuit 21 may be configured to include a communication interface or the transmission function provided in a communication interface.

The input circuit 22 outputs an input signal (analog signal) inputted from outside the field device 10, such as from a control apparatus that controls operation of the equipment in the plant or a connected work terminal device, to the A/D conversion circuit 23. The input signal inputted to the input circuit 22 is also a DC analog signal in the range of 4 mA to 20 mA, like the output signal outputted by the output circuit 21. The work terminal device connected to the input circuit 22 may, for example, be a personal computer (PC) or a portable terminal device, such as a tablet terminal equipped with the functions of a portable digital assistant (PDA), that supports work by the user.

In a case in which the field device 10 communicates over a dedicated communication network established in the plant, the input circuit 22 may be configured to separate the communication signal superimposed on the input signal and output the communication signal to the processor 17 or a non-illustrated communication interface. The inputted communication signal superimposed on the input signal may include information on an instruction equivalent to the verification execution instruction signal, outputted from the operation display 19 to the processor 17, indicating to perform verification of the soundness of the field device 10. The input circuit 22 may be configured to include a communication interface or the reception function provided in a communication interface.

The A/D conversion circuit 23 performs analog-to-digital conversion on the input signal (analog signal) outputted by the input circuit 22 to generate a digital signal with a digital value corresponding to the signal level of the input signal. The A/D conversion circuit 23 outputs the generated digital signal to the processor 17. The processor 17 thereby executes operations and arithmetic processing corresponding to the digital signal outputted by the A/D conversion circuit 23, that is, the information represented by the input signal inputted to the field device 10.

Depending on the configuration of the field device 10, the input circuit 22 and the A/D conversion circuit 23 may be omitted.

The simulated signal generation circuit 13 outputs a pseudo-measurement signal, equivalent to the measurement signal outputted by the sensor 11, to the switch 14 when verifying the operation of the components of the field device 10 in response to control from the operation verifier 171. This pseudo-measurement signal is called a "simulated signal". In the case of verifying the operation of the components of the field device 10, the operation verifier 171 outputs an ON SW control signal to the switch 14 to connect the switch 14 to the buffer circuit 12 and the simulated signal generation circuit 13. In this case, the simulated signal generation circuit 13 outputs the simulated signal to the buffer circuit 12 through the switch 14. In other words, when the operation of the components of the field device 10 is to be verified, the simulated signal generation circuit 13 outputs the measurement signal with the signal level required for the operation verification to the buffer circuit 12 in place of the sensor 11. The simulated signal generation circuit 13 then adjusts the magnitude of the signal level of the simulated signal to a magnitude that covers the operating range of the components in response to control from the operation verifier 171. This enables the field device 10 to verify the operation of the components of the field device 10 over the entire operating range of the components, that is, to increase the coverage in the verification of the soundness of the field device 10.

As described above, the switch 14 switches the measurement signal outputted to the buffer circuit 12 according to the SW control signal inputted from the operation verifier 171. More specifically, in a case in which the field device 10 performs a normal measurement operation to measure the operating status of the installed equipment, an OFF SW control signal is inputted to the switch 14 from the operation verifier 171, and the switch 14 connects the input of the buffer circuit 12 to the sensor 11. In this case, the measurement signal outputted from the sensor 11 is inputted to the buffer circuit 12. On the other hand, in a case in which the field device 10 performs a verification operation to verify soundness, an ON SW control signal is inputted from the operation verifier 171 to the switch 14. While such an ON SW control signal is being inputted, the switch 14 switches the input of the buffer circuit 12 to the simulated signal generation circuit 13. The operation verifier 171 also causes the simulated signal generation circuit 13 to output a simulated signal. The simulated signal outputted from the simulated signal generation circuit 13 is therefore inputted to the buffer circuit 12 during the verification operation.

With this configuration for the field device 10, the field device 10 alone verifies the soundness of the field device 10 itself according to the operation verification program executed by the operation verifier 171 provided in the processor 17. In other words, the field device 10 can also verify the soundness without using an external device such as a device inspection terminal.

The field device 10 according to the present embodiment is a vortex flowmeter. Hence, the simulated signal generation circuit 13 outputs a sinusoidal signal, that simulates the change in pressure caused by the Karman vortex and measured by the pressure sensor of the sensor 11, as a simulated signal. More specifically, the simulated signal generation circuit 13 generates a sinusoidal signal through a filter circuit, such as a low-pass filter, and then divides the generated sinusoidal signal with a voltage divider circuit to achieve a predetermined voltage value and generate a sinusoidal signal with a frequency that simulates various fluid speeds. The simulated signal generation circuit 13 outputs the generated simulated signal to the switch 14. A clock signal (square wave signal) with a frequency that simulates the change in pressure can be generated by, for example, dividing the clock signal at which the processor 17 operates using a non-illustrated timer circuit provided in the processor 17. The clock signal can be the signal of the original oscillating clock oscillated by the clock circuit, the signal of a clock divider that divides the original oscillating clock, or the like. In other words, the simulated signal generation circuit 13 can generate a sinusoidal simulated signal based on the clock signal (square wave signal) inputted from the processor 17. In a case in which the field device 10 is a vortex flowmeter or an oscillating pressure transmitter, the frequency of the clock signal (square wave signal) simulating the change in pressure may, for example, be several Hz to several tens of kHz.

The configuration of the sensor 11, the configuration of and the simulated signals outputted by the simulated signal generation circuit 13, and the like described above are just examples. Various configurations and simulated signals may be adopted depending on the type of field device 10. For example, in a case in which the field device 10 is an electromagnetic flowmeter, the simulated signal generation circuit 13 generates a voltage signal with a DC voltage that simulates various fluid speeds as a simulated signal.

Figure 3:
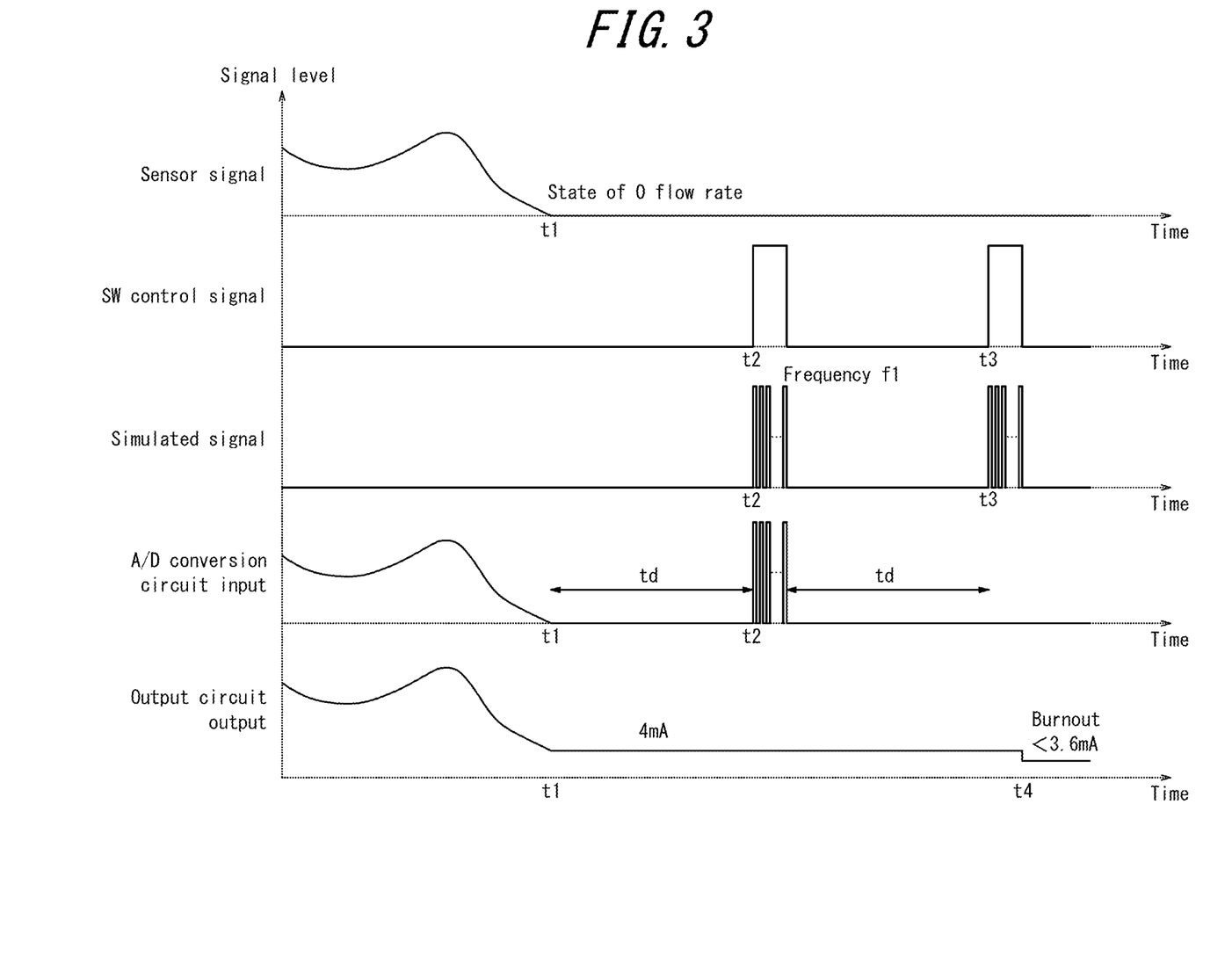
FIG. 3 is a diagram illustrating an example of the time transition of input/output signals in the field device.

FIG. 3 is a diagram illustrating an example of the time transition of input/output signals in the field device 10 according to the present embodiment. In FIG. 3, the "sensor signal" indicates the time transition of the signal level of the measurement signal outputted by the sensor 11. The "SW control signal" indicates the time transition of the signal level of the SW control signal outputted from the operation verifier 171 to the switch 14. The "simulated signal" indicates the time transition of the signal level of the simulated signal outputted from the simulated signal generation circuit 13 to the buffer circuit 12 via the switch 14. The "A/D conversion circuit input" indicates the time transition of the signal level of the signal inputted from the A/D conversion circuit 16 to the processor 17. The "output circuit output" indicates the time transition of the signal level of the signal outputted from the output circuit 21 to an external destination.

In the example in FIG. 3, the signal level of the sensor signal is above 0 until time t1, but is 0 from time t1 onward. This indicates that the flow rate of the fluid was observed before time t1, but the flow rate was 0 from time t1 onward. The operation verifier 171 considers the state in which the flow rate in the pipe is 0 and the signal level of the measurement signal from the sensor 11 does not exceed a certain threshold (i.e., the state in which the flow rate in the pipe continues to be 0) to be a flow rate of 0. The threshold of the signal level to be considered as a flow rate of 0 is set in advance based on noise that may occur in the sensor 11.

In a case in which the flow rate of 0 continues for the reference time td, the operation verifier 171 outputs the ON SW control signal. The reference time td is a predetermined set value. In FIG. 3, the operation verifier 171 outputs the ON SW control signal for a certain period of time from time t2, which is the time at which the reference time td has elapsed from time t1. While the ON SW control signal is being outputted, the switch 14 switches the connection of the input of the buffer circuit 12 from the sensor 11 to the simulated signal generation circuit 13. The operation verifier 171 also causes the simulated signal generation circuit 13 to output a simulated signal. The simulated signal is therefore inputted to the buffer circuit 12 during the verification operation.

The operation verifier 171 outputs a simulated signal of a specific frequency f1 (f1>0) to the simulated signal generation circuit 13 while outputting the ON SW control signal to the switch 14. The measurement signal outputted by the sensor 11 is a sine wave. In contrast, the signal of the simulated signal generation circuit 13 can be a sine wave or a square wave. FIG. 3 depicts the DC level on the vertical axis, but for the simulated signal, the amplitude of the sine wave or square wave is indicated. The simulated signal generation circuit 13 outputs a simulated signal of a specific frequency f1 [Hz]. As illustrated in FIG. 3, the period of the simulated signal is sufficiently shorter than the period when the SW control signal is set to ON in FIG. 3. The details of the signal wave of the simulated signal will be described later with reference to FIGS. 6A and 6B. The simulated signal undergoes analog-to-digital conversion in the A/D conversion circuit 16, and the frequency of the simulated signal is determined in the operation verifier 171.

As illustrated in FIG. 3, the input signal from the A/D conversion circuit 16 to the processor 17 exhibits a waveform similar to that of the measurement signal outputted by the sensor 11 while the input of the buffer circuit 12 is connected to the sensor 11. When the ON SW control signal is outputted and the input of the buffer circuit 12 is connected to the simulated signal generation circuit 13, the input signal from the A/D conversion circuit 16 exhibits a waveform similar to that of the simulated signal.

In the state in which fluid is flowing, that is, the state in which the signal level of the measurement signal exceeds the threshold for determining that the flow rate is 0, the operation verifier 171 does not perform diagnosis. The reason is that the processor 17 may not be able to distinguish between the signal from the sensor 11 and the signal from the simulated signal generation circuit 13. On the other hand, when the flow rate in the pipe is 0, the frequency of the output from the sensor 11 is 0 Hz. Hence, if the frequency f1 of the simulated signal is set to a value other than 0 Hz, the operation verifier 171 can distinguish between the output from the sensor 11 and the output from the simulated signal generation circuit 13. Here, the operation verifier 171 of the processor 17 may determine that the flow rate measured by the sensor 11 is 0 when the level of the input signal from the A/D conversion circuit 16 is less than a predetermined threshold. In a case in which the input signal from the A/D conversion circuit 16 is based on the output of the sensor 11, the operation verifier 171 therefore outputs a signal corresponding to the signal level of the input signal to the D/A conversion circuit 20 as is. On the other hand, in a case in which the input signal from the A/D conversion circuit 16 is based on the output of the simulated signal generation circuit 13, the operation verifier 171 outputs a signal with a signal level of 0 to the D/A conversion circuit 20, regardless of the waveform of the simulated signal. The reason is that the flow rate measured by the sensor 11 from time t1 to t2 is 0. By outputting a signal indicating the same state of a flow rate of 0 to the D/A conversion circuit 20 from t2 onward as well, the processor 17 can continue to output the measured value of a physical quantity while verifying the operational soundness of the field device 10. This process of fixing the level of the signal outputted from the processor 17 to the D/A conversion circuit 20 at a specific value ("0" in the example here, which is the immediately previous measured value) in this way while the simulated signal is being inputted to the buffer circuit 12 is referred to as masking the output circuit. By the output circuit being masked, the output of the output circuit 21 reflects the waveform of the output signal of the sensor 11 while the flow rate exceeds 0, and is fixed at 0 regardless of the waveform of the simulated signal while the flow rate is 0 and the simulated signal generation circuit 13 is connected to the buffer circuit 12, as illustrated in FIG. 3. The masking of the output circuit is not limited to fixing the signal level of the output of the output circuit 21 at "0" but may also fix the signal level at another immediately previous measured value. For example, the processor 17 may perform masking with a positive, immediately previous measured value in the case in which the temporal variation of the flow rate is small (for example, when the variation of the flow rate per unit time is less than a predetermined threshold). The processor 17 may also perform masking using a predetermined measured value of the sensor 11 (for example, a flow rate of 0) during the soundness verification, regardless of the measured value of the flow rate immediately before the soundness verification.

In this way, in the present embodiment, the output of the output circuit 21 is fixed at the output equivalent to a flow rate of 0 while the operation verifier 171 is making the determination after the simulated signal generation circuit 13 is connected to the buffer circuit 12. In this way, since the flow rate in the pipe remains 0, the output of the output circuit 21 reflects the physical quantity that should be measured by the sensor 11. According to the present embodiment, the field device 10 can therefore output the measured value of a physical quantity even while the operational soundness of the field device 10 is being verified.

Furthermore, the operation verifier 171 verifies the soundness of the buffer circuit 12, the amplification/band limiting circuit 15, and the A/D conversion circuit 16 based on the frequency of the signal inputted from the A/D conversion circuit 16 while the simulated signal generation circuit 13 is connected to the buffer circuit 12 (that is, while the SW control signal is ON). In other words, while the simulated signal generation circuit 13 is connected to the buffer circuit 12, the operation verifier 171 makes a determination of normal if the frequency of the signal inputted from the A/D conversion circuit 16 is f1 and a determination of abnormal if the frequency is not f1. In the example in FIG. 3, even though the SW control signal is ON for a certain period of time from time t3, the signal level of the signal inputted from the A/D conversion circuit 16 is 0. In such a case, the operation verifier 171 determines that there is an abnormality in the buffer circuit 12, the amplification/band limiting circuit 15, and/or the A/D conversion circuit 16.

In a case in which the result of such verification is a normal determination, the operation verifier 171 returns the SW control signal to OFF and connects the output of the sensor 11 to the buffer circuit 12. The operation verifier 171 also releases the mask fixing the output of the output circuit 21. On the other hand, in a case in which an abnormality is determined, the operation verifier 171 causes the output of the output circuit 21 to burn out and notifies a higher-level device of the abnormal status. Burnout refers to how, in a case in which an abnormality is detected in a component of the field device 10, notification of the abnormality is provided by output of a signal (such as 3.6 mA or less, or 21.6 mA or more) outside the standard range (such as 4 mA to 20 mA). In the example of FIG. 3, even though the SW control signal is turned ON at time t3, the input from the A/D conversion circuit 16 is 0. The operation verifier 171 thus detects an abnormality. The operation verifier 171 therefore detects the output of a signal of less than 3.6 mA from the output circuit 21 at time t4 and performs a burnout. In this way, the operation verifier 171 can detect an abnormality and notify other apparatuses and the like of the abnormality in a case in which the simulated signal is inputted, but no corresponding output is provided.

Figure 4:
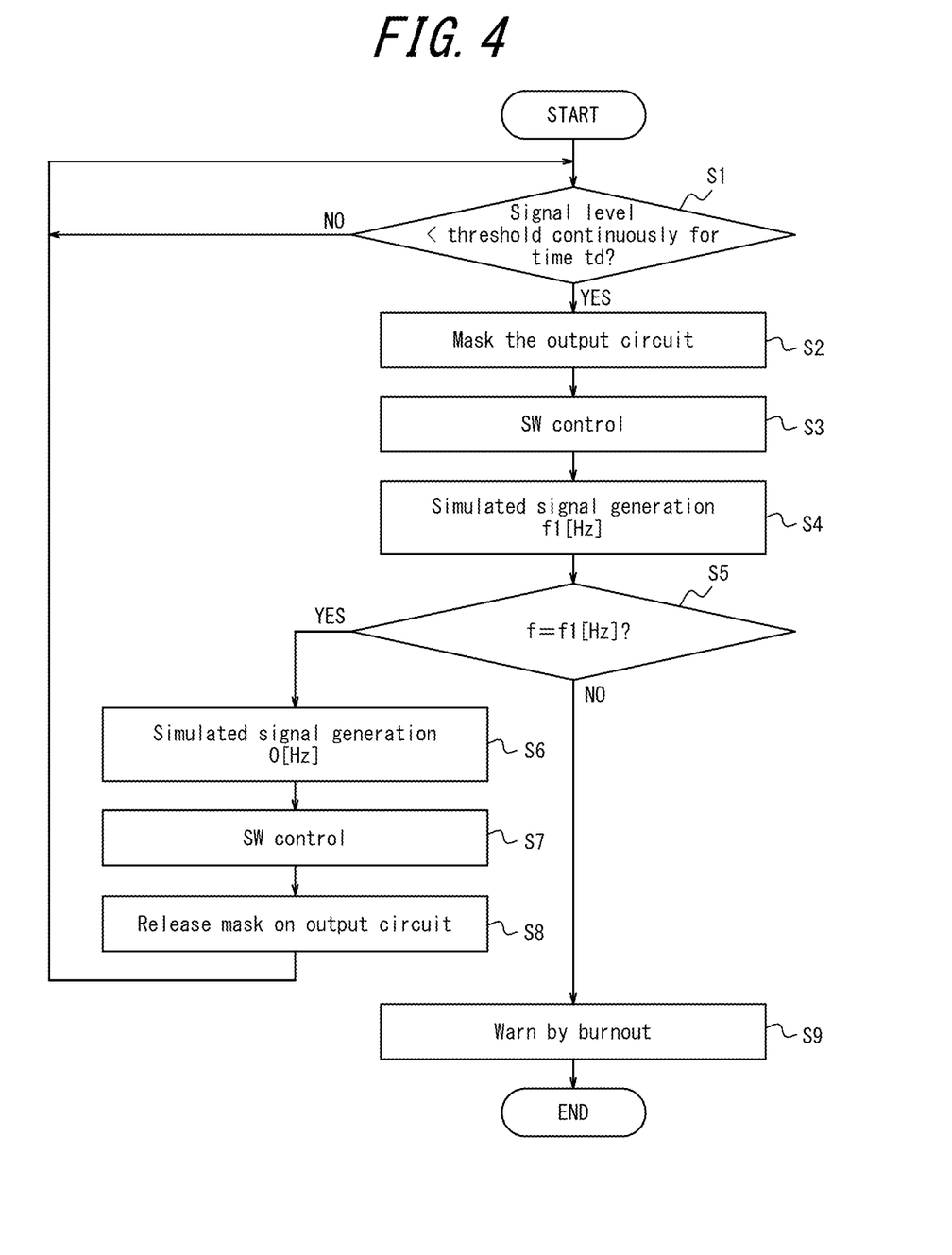
FIG. 4 is a flowchart illustrating an example of operations of the field device.

FIG. 4 is a flowchart illustrating an example operations of the field device 10. Each step in FIG. 4 is executed based on control by the processor 17. As prior conditions of the following process, the SW control signal is OFF, the buffer circuit 12 is connected to the sensor 11 by the switch 14, and a physical quantity is being measured.

In step S1, the processor 17 determines whether the level of the input signal from the A/D conversion circuit 16 has continued to be below a predetermined threshold for a period of time td. This threshold is the upper limit at which the signal level of the measurement signal should be determined to be a flow rate of 0. If the level of the input signal has continued to be below the threshold for the period of time td (YES in step S1), the processor 17 proceeds to step S2. Otherwise (NO in step S1), the processor 17 continues the process of step S1. The field device 10 according to the present embodiment verifies the operational soundness in the case in which the flow rate is 0, but alternatively, the operational soundness may be verified in the case in which a specific value continues to be outputted as the flow rate for a certain period of time.

In step S2, the processor 17 masks the output of the output circuit 21 with a specific value (for example, the immediately previous measured value). In the case of verifying the soundness when the measured value of the sensor 11 is 0, the processor 17 may, for example, output a fixed value of the signal level "0" immediately before the soundness verification to the D/A conversion circuit 20. As described above, the processor 17 may output a signal corresponding to a measurement signal indicating a predetermined measured value of the sensor 11 instead of a signal corresponding to the measurement signal subjected to the conversion process and acquired immediately before the operational soundness of the converter is verified.

In step S3, the processor 17 outputs the ON SW control signal to the switch 14 to switch the input of the buffer circuit 12 from the sensor 11 to the simulated signal generation circuit 13.

In step S4, the processor 17 controls the simulated signal generation circuit 13 to output a simulated signal with frequency f1. The processor 17 may control the simulated signal generation circuit 13 to output the simulated signal starting before the input of the buffer circuit 12 is switched from the sensor 11 to the simulated signal generation circuit 13, as illustrated in FIG. 3.

In step S5, the processor 17 determines whether the frequency f of the signal inputted from the A/D conversion circuit 16 is the same as the frequency f1 of the simulated signal. In the case in which the frequency f is the same as the frequency f1 of the simulated signal (YES in step S5), the process proceeds to step S6. Otherwise (NO in step S5), the process proceeds to step S9. If the buffer circuit 12, the amplification/band limiting circuit 15, and the A/D conversion circuit 16 are operating normally, the frequency f of the signal inputted from the A/D conversion circuit 16 should match the frequency f1 of the simulated signal. Therefore, the process from S6 onward corresponds to the case of no abnormality being detected, and the process of S9 corresponds to the case of an abnormality being detected.

In step S6, the processor 17 changes the frequency of the simulated signal to 0 [Hz]. For example, the processor 17 may fix the output of the simulated signal generation circuit 13 at 0.

In step S7, the processor 17 outputs the OFF SW control signal to the switch 14 to switch the input of the buffer circuit 12 from the simulated signal generation circuit 13 to the sensor 11.

In step S8, the processor 17 releases the mask on the output of the output circuit 21. The output circuit 21 consequently outputs a signal corresponding to the measured value measured by the sensor 11.

On the other hand, in step S9, the processor 17 performs a burnout to warn other apparatuses. The processor 17 then terminates the process of the flowchart.

As described above, the field device 10 includes the sensor 11 that measures a physical quantity and outputs a measurement signal indicating a measured value, the converter that performs a predetermined conversion process on the measurement signal, and the processor 17 that outputs an output signal corresponding to the measurement signal subjected to the conversion process. Here, the converter according to the present embodiment includes the buffer circuit 12, the amplification/band limiting circuit 15, and the A/D conversion circuit 16. The processor 17 starts verifying the operational soundness of the converter in a case in which the measurement signal subjected to the conversion process satisfies a predetermined condition. While the operational soundness of the converter is being verified, the processor 17 outputs a signal corresponding to the measurement signal subjected to the conversion process and acquired immediately before operational verification, or a signal corresponding to a measurement signal indicating a predetermined measured value of the sensor 11, as the output signal. According to the field device 10, the measured value of a physical quantity can therefore be outputted even while the operational soundness of the field device 10 is being verified.

The processor 17 of the field device 10 starts verifying the operational soundness of the converter in a case in which, as the predetermined condition, the signal level of the measurement signal subjected to the conversion process continues to be below a predetermined threshold for a predetermined reference time td. Therefore, according to the field device 10, the verification of the operational soundness of the field device can start in response to the physical quantity measured by the sensor 11 being considered to be 0 continuously for the reference time td. Therefore, the field device 10 can automatically determine conditions that do not affect the measurement and verify the operational soundness without the user having to take action such as stopping operation of the apparatus in order to verify the operational soundness.

The processor 17 of the field device 10 outputs, as the output signal, a signal corresponding to the measurement signal indicating that the measured value is 0 while the operational soundness of the converter is being verified. When the state in which the physical quantity measured by the sensor 11 is 0 continues for a certain period of time, the physical quantity typically does not change right away. According to the field device 10, a value reflecting the physical quantity can therefore be outputted even while the operational soundness of the field device 10 is being verified.

The processor 17 of the field device 10 verifies the operational soundness of the converter based on a waveform of a signal outputted by the converter while the output of the simulated signal generation circuit 13 that outputs a simulated signal with a predetermined waveform is being inputted to the converter. As an example of such a simulated signal with a predetermined waveform, the processor 17 inputs a simulated signal with a predetermined frequency f1 to the converter and verifies the operational soundness of the converter based on the frequency of the signal outputted from the converter. For example, the processor 17 may detect an abnormality when the frequency of the signal outputted from the converter differs from the frequency f1. According to the field device 10, abnormal operations of the field device 10 can therefore be detected by a simple process.

The processor 17 of the field device 10 switches the input to the converter from the output of the sensor 11 to the output of the simulated signal generation circuit 13 and verifies the operational soundness of the converter based on the signal outputted by the converter. Therefore, according to the field device 10, the operational soundness of the converter can be verified by simply switching the input to the converter. The operational soundness of the field device 10 can thus be verified by a simple process.

In a case in which an abnormality is detected by verification of the operational soundness of the converter, the processor 17 of the field device 10 outputs a signal indicating detection of the abnormality (for example, a burnout signal). The signal indicating detection of the abnormality may, for example, be a signal that causes the operation display 19 to display an indication of the abnormality detection or that notifies other apparatuses of the abnormality detection. Therefore, according to the field device 10, the user can easily learn of the failure. For example, the user can subsequently deal with the manufacturer smoothly.

As described above, the field device 10 according to the present embodiment can diagnose the operational soundness of the buffer circuit 12, the amplification/band limiting circuit 15, and the A/D conversion circuit 16 and can identify the location of failure. In other words, the field device 10 can verify operations of converters or detectors while attached to piping, or while the sensor 11 is attached, without the need to remove the converters or detectors or to perform diagnosis using individual testers or external devices. Furthermore, in a case in which component failure is suspected, the field device 10 can distinguish between failure in the sensor 11 and failure in the buffer circuit 12, the amplification/band limiting circuit 15, and the A/D conversion circuit 16, thereby reducing the burden on the user when failure occurs.

Second Embodiment

Figure 5:
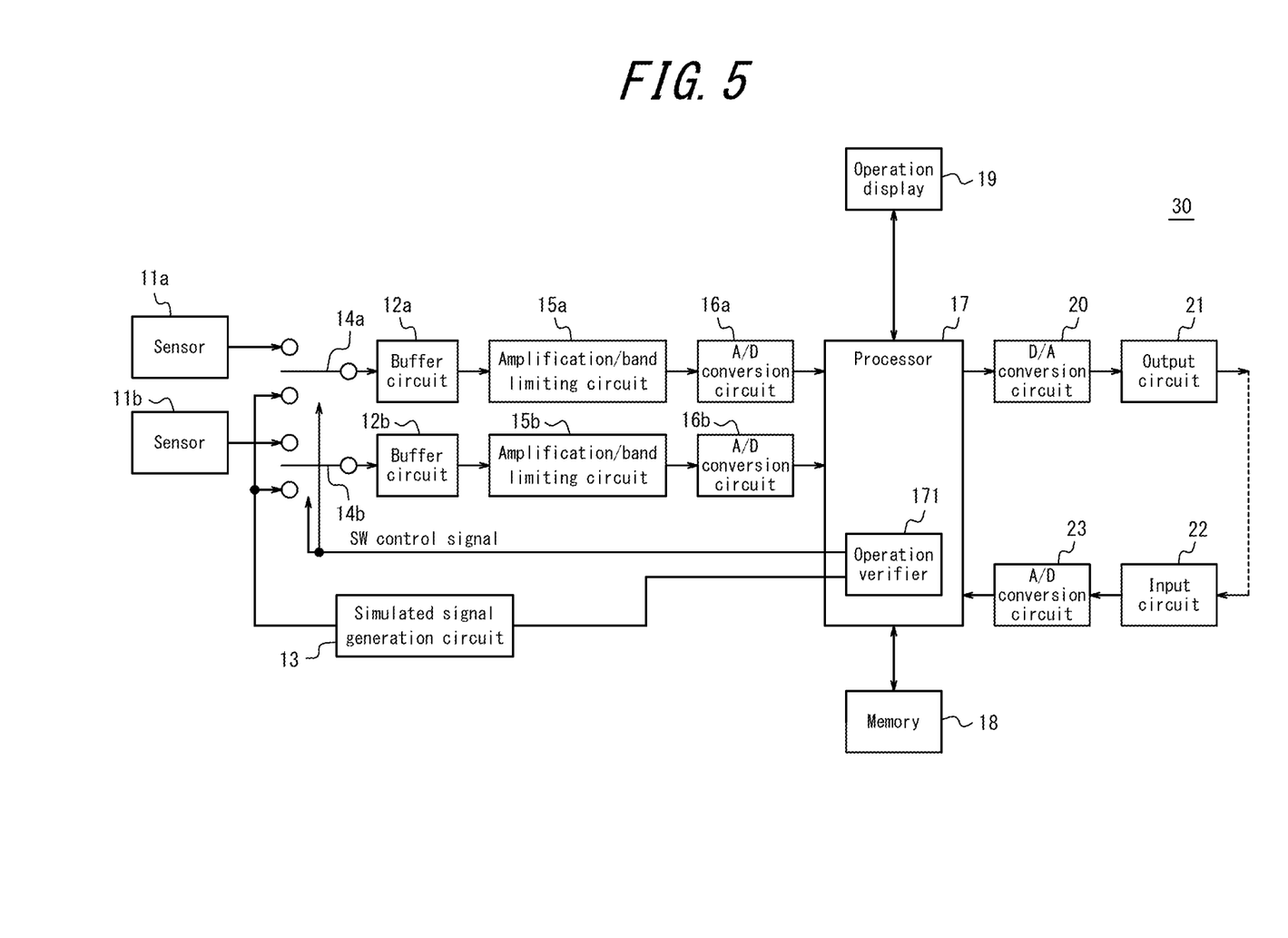
FIG. 5 is a diagram illustrating an example configuration of a field device according to a second embodiment.

In the first embodiment, a configuration example of the field device 10 including only one sensor 11, one buffer circuit 12, one amplification/band limiting circuit 15, and one A/D conversion circuit 16 was described. The configuration of the field device 10 is not, however, limited to this example, and a plurality of each of the sensor 11, the buffer circuit 12, the amplification/band limiting circuit 15, and the A/D conversion circuit 16 may be included. As an example of this configuration, a field device 30 including two sensors 11, two buffer circuits 12, two amplification/band limiting circuits 15, and two A/D conversion circuits 16 is described in the present embodiment. FIG. 5 is a diagram illustrating an example configuration of the field device 30 according to the second embodiment. In FIG. 5, similar configurations to the first embodiment are labeled with the same reference signs, and a detailed description thereof is omitted.

The field device 30 includes sensors 11a, 11b, buffer circuits 12a, 12b, a simulated signal generation circuit 13, switches 14a, 14b, amplification/band limiting circuits 15a, 15b, A/D conversion circuits 16a, 16b, a processor 17, a memory 18, an operation display 19, a D/A conversion circuit 20, an output circuit 21, an input circuit 22, and an A/D conversion circuit 23. The field device 30 may cancel out noise in a noisy environment based on the measurement signal from the sensor 11a and the measurement signal from the sensor 11b. Alternatively, the field device 30 may use the measurement signal from the sensor 11a and the measurement signal from the sensor 11b each as a single signal.

In this configuration, the switch 14a switches the input of the buffer circuit 12a between the output signal from the sensor 11a and the output signal from the simulated signal generation circuit 13 based on an SW control signal inputted from an operation verifier 171. The switch 14b switches the input of the buffer circuit 12b between the output signal from the sensor 11b and the output signal from the simulated signal generation circuit 13 based on an SW control signal inputted from the operation verifier 171.

The processor 17 of the field device 30 switches the SW control signal from OFF to ON and outputs a simulated signal from the simulated signal generation circuit 13 to the buffer circuits 12a, 12b in a case in which the following conditions (1) or (2) are continuously satisfied for a reference time td. The simulated signal is a signal with a predetermined waveform (for example, a signal with a predetermined frequency).

(1) Either of the measurement signals from the sensors 11a, 11b is at a signal level that can be considered as 0.
(2) The level ratio between the measurement signals of the sensors 11a, 11b (for example, (signal level of sensor 11a)/(signal level of sensor 11b)) exceeds a predetermined threshold or falls below another predetermined threshold.

As in the first embodiment, condition (1) can be detected, for example, by the signal level of either of the measurement signals from the sensors 11a, 11b not exceeding a predetermined threshold. In a case in which condition (1) is continuously satisfied for the reference time td, diagnosis is performed on whichever of the sensors 11a and 11b has a signal level is 0, and in the case of outputting an output signal corresponding to the measurement signal of whichever of the sensors 11a and 11b is being diagnosed, the output circuit 21 is masked as described above. In other words, while the operational soundness of the converter is being verified, the processor 17 outputs a signal corresponding to the measurement signal subjected to the conversion process and acquired immediately before verification of operational soundness, or a signal corresponding to a measurement signal indicating a predetermined measured value of the sensor 11a or 11b, as the output signal. The field device 30 can thereby output the measured value of a physical quantity (such as a vortex generated in a fluid) even while the operational soundness of the field device 30 is being verified.

The condition (2) corresponds to failure in either a first measurement system that includes the sensor 11a, the buffer circuit 12a, the amplification/band limiting circuit 15a, and the A/D conversion circuit 16a, or in a second measurement system that includes the sensor 11b, the buffer circuit 12b, the amplification/band limiting circuit 15b, and the A/D conversion circuit 16b. The threshold in condition (2) is determined based on the range of values that the level ratio between the measurement signals of the sensors 11a, 11b can take during normal operation. In this way, the field device 30 outputs the simulated signal to the buffer circuits 12a, 12b and performs operation verification in the case in which the condition (2) is continuously satisfied for the reference time td. Therefore, the field device 30 can verify the operational soundness of the field device 30 automatically at the timing at which the occurrence of a failure is suspected due to the level ratio of the measurement signal deviating from the values that can be taken during normal operation. Also, by masking the output circuit 21 as described above in the case of outputting an output signal corresponding to the measurement signal of whichever of the sensors 11a and 11b is being subjected to soundness verification, the processor 17 can output the measured value of a physical quantity even while the operational soundness is being verified.

The operation verifier 171 performs operation verification after switching the input of the buffer circuit 12a or 12b, whichever one corresponds to the sensor 11a or 11b that is thought to be outputting a measurement signal whose signal level can be considered as 0, to the output of the simulated signal generation circuit 13. For example, in the case in which ((signal level of sensor 11a)/(signal level of sensor 11b)) exceeds a predetermined first threshold, the signal level of the sensor 11b can be considered extremely low. Therefore, in such a case, the operation verifier 171 may switch the switch 14b so that the output of the simulated signal generation circuit 13 is connected to the input of the buffer circuit 12b. For example, in the case in which ((signal level of sensor 11a)/(signal level of sensor 11b)) falls below a predetermined second threshold (second threshold<first threshold), the signal level of the sensor 11a can be considered extremely low. Therefore, in such a case, the operation verifier 171 may switch the switch 14a so that the output of the simulated signal generation circuit 13 is connected to the input of the buffer circuit 12a.

As the measurement signal level ratio of the sensors 11a, 11b in (2), the operation verifier 171 may calculate the ratio of the maximum power spectra after a Fourier transform. In this way, the operation verifier 171 can perform more reliable diagnosis by verifying the soundness of the buffer circuits 12a, 12b, the amplification/band limiting circuits 15a, 15b, and the A/D conversion circuits 16a, 16b based not only on the signal levels but also the frequency components. For example, the operation verifier 171 may determine that a state in which the maximum spectrum is observed in band 1 on the sensor 11a side, whereas the maximum spectrum is observed in band 2 on the sensor 11b side, is abnormal.

In addition, the types of switches 14a, 14b can be changed to connect the signal from sensor 11a to the buffer circuit 12b, or connect the signal from sensor 11b to the buffer circuit 12a. In other words, the input of the buffer circuit 12a can be switched not only between the sensor 11a and the simulated signal generation circuit 13, but also the sensor 11b, and the input of the buffer circuit 12b can be switched not only between the sensor 11b and the simulated signal generation circuit 13, but also the sensor 11a. This enables identification not only of an abnormality from the buffer circuits 12a, 12b up to the A/D conversion circuits 16a, 16b, but also of failure on the sensor 11a, 11b side. In other words, an abnormality from the buffer circuits 12a, 12b up to the A/D conversion circuits 16a, 16b can be identified, as in the first embodiment, based on whether the frequency of the output from the A/D conversion circuits 16a, 16b conforms to the simulated signal when the simulated signal is inputted to the buffer circuits 12a, 12b. Furthermore, the output of the A/D conversion circuit 16a when the input to the buffer circuit 12a is connected to the sensor 11a and when the input is connected to the sensor 11b can be compared, and in a case in which the outputs greatly differ, it can be determined that failure has occurred in one of the sensors 11a, 11b. When an abnormality is detected, the processor 17 outputs a signal indicating the detection as an output signal, in the same way as in the first embodiment.

Other Embodiments

Figure 6A:
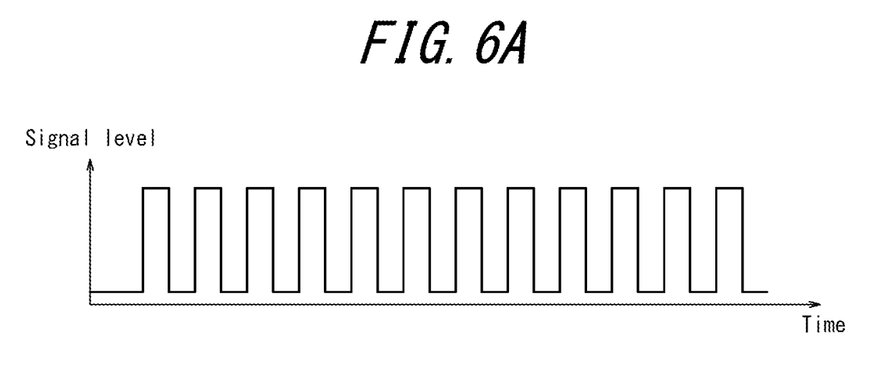
FIG. 6A is a diagram illustrating example output of a simulated signal generation circuit.
Figure 6B:
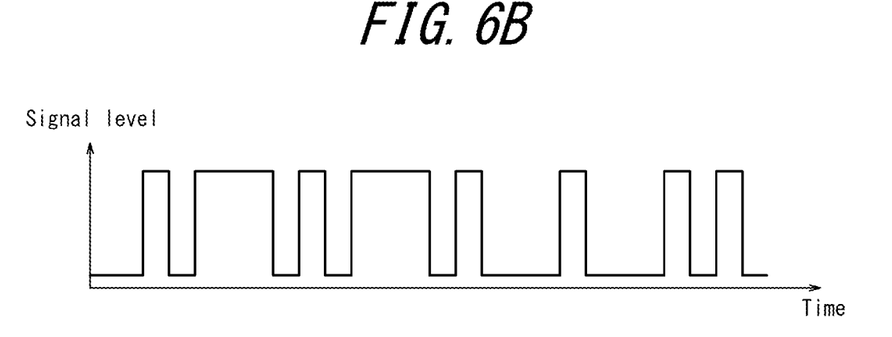
FIG. 6B is a diagram illustrating example output of the simulated signal generation circuit.

In the first and second embodiments, an example has been explained in which the operational soundness of the converter is verified based on the frequency of the signal outputted from the converter while the output of the simulated signal generation circuit 13, which outputs a signal with a predetermined frequency as a simulated signal, is being inputted to the converter. The simulated signal from the simulated signal generation circuit 13 may, however, be a signal whose frequency fluctuates in a specific pattern, instead of a signal with a constant frequency. By the simulated signal being a signal whose frequency fluctuates in a specific pattern, the reliability of the diagnosis can be improved. FIGS. 6A and 6B are diagrams illustrating example output of the simulated signal generation circuit 13.

FIG. 6A illustrates an example of a simulated signal with a constant frequency. FIG. 6B illustrates an example of a simulated signal that fluctuates with a waveform of a predetermined specific pattern. As illustrated in FIG. 6A, in the case in which the frequency of the simulated signal is constant, a circuit of the field device 10, 30 might oscillate by chance at the same frequency as the frequency of the simulated signal due to failure. During such failure, it may not be possible to distinguish between the oscillating signal caused by the failure and the signal based on the simulated signal. In such a case, the field device 10, 30 might not be able to detect abnormal operation of the buffer circuit 12, the amplification/band limiting circuit 15, and the A/D conversion circuit 16. By contrast, in the case in which the waveform of the simulated signal fluctuates in a predetermined specific pattern, it is extremely unlikely that a circuit of the field device 10, 30 will transmit a waveform identical to the specific pattern due to a failure. A situation in which the operational soundness cannot be verified due to transmission by a circuit can therefore be prevented. Accordingly, the reliability of verification can be improved by using a signal with a predetermined complex pattern as the simulated signal and verifying the operational soundness based on whether the waveforms match. The determination of whether the waveforms of the signals match may be made by directly comparing the waveforms or by comparing the frequency spectra of the signals.

Such a simulated signal may, for example, be determined by analyzing each type of failure mode recognized in the past for the field device 10, 30 and selecting a signal that is distinguishable from the signal waveform observed due to failure-based oscillation. Alternatively, in a case in which a signal with a specific waveform is known to be generated in response to inclusion of bubbles in the liquid phase, impact to the piping, vibration of the piping, or the like depending on the form of use of the field device 10, 30, the simulated signal may be determined by selecting a signal that is distinguishable from the signal with such a waveform.

The condition for the operation verifier 171 to output the ON SW control signal and perform operation verification with the simulated signal may be set as follows, in addition to the case of the flow rate of 0 continuing for a certain period of time.

The SW control signal is turned ON at a specific time or during a specific period of time (for example, the SW control signal is turned on at the time, known in advance, that the flow rate will become 0).

The SW control signal is turned on when a specific diagnostic alarm occurs.

The SW control signal is turned ON by the input of a status signal from an external source (for example, the SW control signal is turned ON in response to the input of a status signal indicating that fluid discharge in the plant has stopped).

The operational soundness of the field device 10, 30 can thereby be verified at a timing desired by the user.

The present disclosure is not limited to the above embodiments. For example, a plurality of blocks described in the block diagrams may be integrated, or a block may be divided. Instead of a plurality of steps described in the flowcharts being executed in chronological order in accordance with the description, the plurality of steps may be executed in parallel or in a different order according to the processing capability of the apparatus that executes each step, or as required. Other modifications can be made without departing from the spirit of the present disclosure.

The invention claimed is:

1. A field device comprising:
a sensor configured to measure a physical quantity and output a measurement signal indicating a measured value;
a converter configured to perform a predetermined conversion process on the measurement signal; and
a processor configured to output an output signal corresponding to the measurement signal subjected to the conversion process, wherein
the processor
starts verifying operational soundness of the converter in a case in which a signal level of the measurement signal subjected to the conversion process continues to be below a predetermined threshold for a predetermined reference time, and
outputs, while the operational soundness of the converter is being verified, a signal corresponding to the measurement signal subjected to the conversion process and acquired immediately before the operational soundness of the converter is verified, or a signal corresponding to the measurement signal indicating a predetermined measured value of the sensor, as the output signal.

2. The field device of claim 1, wherein the processor outputs, while the operational soundness of the converter is being verified, a signal corresponding to the measurement signal indicating that the measured value is 0 as the output signal.

3. The field device of claim 1, wherein the processor verifies the operational soundness of the converter based on a waveform of a signal outputted by the converter while an output of a simulated signal generation circuit that outputs a simulated signal with a predetermined waveform is being inputted to the converter.

4. The field device of claim 3, wherein the processor verifies the operational soundness of the converter based on a frequency of the signal outputted by the converter while an output of the simulated signal generation circuit that outputs a signal of a predetermined frequency as the simulated signal is being inputted to the converter.

5. The field device of claim 3, wherein the processor switches an input to the converter from an output of the sensor to an output of the simulated signal generation circuit and verifies the operational soundness of the converter based on the signal outputted by the converter.

6. The field device of claim 1, wherein in a case in which an abnormality is detected by verification of the operational soundness of the converter, the processor outputs a signal indicating detection of the abnormality as the output signal.

7. The field device of claim 1, wherein the conversion process includes a process to amplify the measurement signal, a process to limit a frequency band of the measurement signal, and/or a process of analog-to-digital conversion on the measurement signal.

8. The field device of claim 1, wherein the sensor measures a vortex generated in a fluid as the physical quantity.

9. A field device comprising:
a first sensor configured to measure a physical quantity and output a first measurement signal indicating a measured value;
a second sensor configured to measure a physical quantity and output a second measurement signal indicating a measured value;
a first converter configured to perform a predetermined first conversion process on the first measurement signal outputted from the first sensor;
a second converter configured to perform a predetermined second conversion process on the second measurement signal outputted from the second sensor; and
a processor configured to output a first output signal corresponding to the first measurement signal subjected to the first conversion process and a second output signal corresponding to the second measurement signal subjected to the second conversion process, wherein the processor starts verifying the operational soundness of the first converter and the second converter in a case in which a ratio between a signal level of the first measurement signal subjected to the first conversion process by the first converter and a signal level of the second measurement signal subjected to the second conversion process by the second converter satisfies a predetermined condition, outputs, while the operational soundness of the first converter is being verified, a signal corresponding to the first measurement signal subjected to the first conversion process and acquired immediately before the operational soundness of the first converter is verified, or a signal corresponding to the first measurement signal indicating a predetermined measured value of the first sensor, as the first output signal, and outputs, while the operational soundness of the second converter is being verified, a signal corresponding to the second measurement signal subjected to the second conversion process and acquired immediately before the operational soundness of the second converter is verified, or a signal corresponding to the second measurement signal indicating a predetermined measured value of the second sensor, as the second output signal.

* * * * *